United States Patent
Kardatzke (10) Patent No.: US 9,461,895 B1
(45) Date of Patent: Oct. 4, 2016

(54) METHOD FOR DETECTING AND REQUESTING RETRANSMISSION OF LOST MPEG-TS PACKETS ON LOSSY TRANSMISSIONS

(71) Applicant: Google Inc., Mountain View, CA (US)

(72) Inventor: Jeffrey Arthur Kardatzke, Redondo Beach, CA (US)

(73) Assignee: Google Inc., Mountain View, CA (US)

( * ) Notice: Subject to any disclaimer, the term of this patent is extended or adjusted under 35 U.S.C. 154(b) by 454 days.

(21) Appl. No.: 14/013,787

(22) Filed: Aug. 29, 2013

(51) Int. Cl.
*G06F 15/173* (2006.01)
*H04L 12/26* (2006.01)
*H04L 12/801* (2013.01)

(52) U.S. Cl.
CPC .............. *H04L 43/04* (2013.01); *H04L 47/11* (2013.01)

(58) Field of Classification Search
CPC ... H04L 43/0817; H04L 47/11; H04L 49/90; H04L 47/30; H04L 47/283
See application file for complete search history.

(56) References Cited

U.S. PATENT DOCUMENTS

| 7,020,165 B2 * | 3/2006 | Rakib | H03M 13/256 348/E7.07 |
| 2001/0027468 A1 * | 10/2001 | Okura | H04N 21/23412 709/202 |
| 2004/0150516 A1 * | 8/2004 | Faetanini | B60C 23/0408 340/444 |
| 2010/0122135 A1 * | 5/2010 | Lida | H04L 1/007 714/748 |
| 2010/0165872 A1 * | 7/2010 | Jiang | H04L 43/0817 370/253 |
| 2010/0182911 A1 * | 7/2010 | Pullen | H04L 1/1635 370/241 |
| 2013/0125189 A1 * | 5/2013 | Ruiz Alonso | H04L 1/1877 725/110 |
| 2014/0301223 A1 * | 10/2014 | Wong | H04L 1/1825 370/252 |

FOREIGN PATENT DOCUMENTS

DE        EP 2432161 A1 *  3/2012  ........... H04L 41/069

* cited by examiner

*Primary Examiner* — Arvin Eskandarnia
(74) *Attorney, Agent, or Firm* — Honigman Miller Schwartz and Cohn LLP (57) ABSTRACT

Methods, mediums, and systems are described for detecting the loss of one or more packets in a data stream and identifying the missing packets so that they may be retransmitted. The packets of the data stream may be associated with a continuity counter capable of representing a number n of values. A number m of packets of the data stream may be encapsulated into an encapsulating packet, where m does not share any common factors with n. Accordingly, if a number of streaming packets are lost, the loss of the packets may be readily detected even when the number of lost packets is a multiple of n. The received packets may be searched for a range including the missing packets and bounded by packets that are likely to be unique. Once the bounding packets are identified, packets between the bounding packets may be requested from the original sender.

20 Claims, 10 Drawing Sheets

| Packet 1 | Packet 2 | Packet 3 | Packet 4 |
|---|---|---|---|
| Continuity Counter: 0 | Continuity Counter: 1 | Continuity Counter: 2 | Continuity Counter: 3 |

| Packet 5 | Packet 6 | Packet 7 | Packet 8 |
|---|---|---|---|
| Continuity Counter: 4 | Continuity Counter: 5 | Continuity Counter: 6 | Continuity Counter: 7 |

| Packet 9 | Packet 10 | Packet 11 | Packet 12 |
|---|---|---|---|
| Continuity Counter: 8 | Continuity Counter: 9 | Continuity Counter: 10 | Continuity Counter: 11 |

| Packet 13 | Packet 14 | Packet 15 | Packet 16 |
|---|---|---|---|
| Continuity Counter: 12 | Continuity Counter: 13 | Continuity Counter: 14 | Continuity Counter: 15 |

| Packet 17 | Packet 18 | Packet 19 | Packet 20 |
|---|---|---|---|
| Continuity Counter: 0 | Continuity Counter: 1 | Continuity Counter: 2 | Continuity Counter: 3 |

| Packet 1 | Packet 2 | Packet 3 | Packet 4 |
| --- | --- | --- | --- |
| Packet 5 (Video Data) | Packet 6 (Administrative) | Packet 7 (Administrative) | Packet 8 (Administrative) |
| Packet 9 (Missing) | Packet 10 (Missing) | Packet 11 (Missing) | Packet 12 (Missing) |
| Packet 13 (Missing) | Packet 14 (Missing) | Packet 15 (Missing) | Packet 16 (Missing) |
| Packet 17 (Administrative) | Packet 18 (Administrative) | Packet 19 (Audio Data) | Packet 20 |

METHOD FOR DETECTING AND REQUESTING RETRANSMISSION OF LOST MPEG-TS PACKETS ON LOSSY TRANSMISSIONS

BACKGROUND

Communications networks may transmit information in the form of data packets. The information may be divided into packets at a sender, transmitted from the sender to a receiver, and reassembled at the receiver to retrieve the information. These packets may be sent over a "lossy" communications medium that does not guarantee that a transmitted packet will actually reach its intended destination. Furthermore, is no guarantee that the packets will be received in the proper order, thus there may be a need to rearrange the packets at the receiver.

In order to detect packet loss and arrange the received packets in the proper order, the sender may append a continuity counter to the transmitted packets. The continuity counter may identify the packets using sequentially assigned identifiers. Because the continuity counter has a finite size, only a limited number of identifiers can be used. Accordingly, the identifiers are typically provided in a repeating sequence by applying sequential identifiers from a minimum identifier value through a maximum identifier value, and then returning to the minimum identifier number to create a repeating sequence of identifiers. One example of such a loop using a two-bit continuity counter (capable of representing four values) is "0-1-2-3-0-1-2-3-0-1-2-3- . . . "

Figure 1A:
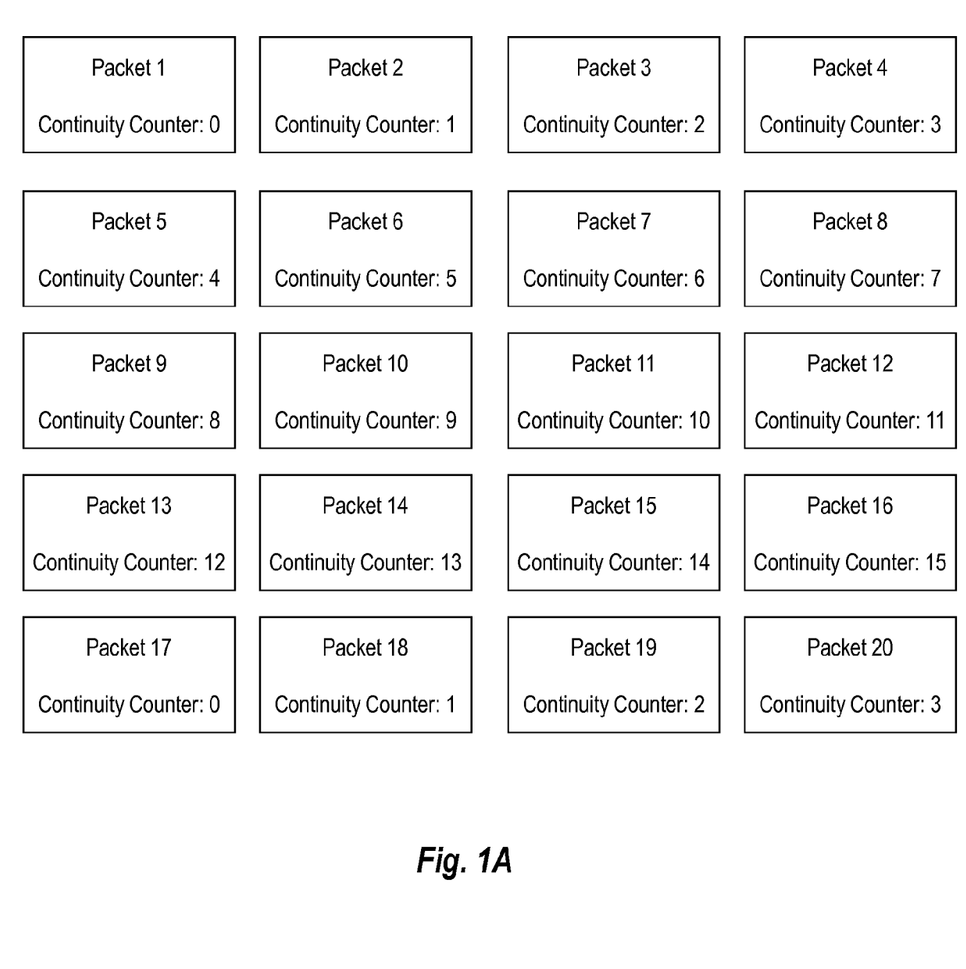
FIGS. 1A-1C depict exemplary conventional data streams including a plurality of packets.

A similar example is depicted in FIG. 1A, where a data stream including twenty packets is transmitted from a sender. The data stream of FIG. 1A may represent, for example, an MPEG2 Transport Stream ("MPEG2-TS") or any other suitable stream of packetized data. Each of the packets of the data stream includes a 4-bit continuity counter. A 4-bit counter is capable of representing sixteen values (e.g., zero through fifteen), and accordingly when the maximum value (fifteen) is reached, the continuity counter resets to the minimum value (zero) for the next packet. This procedure can be seen in the transition between Packet 16 and Packet 17 in FIG. 1A.

Figure 1B:
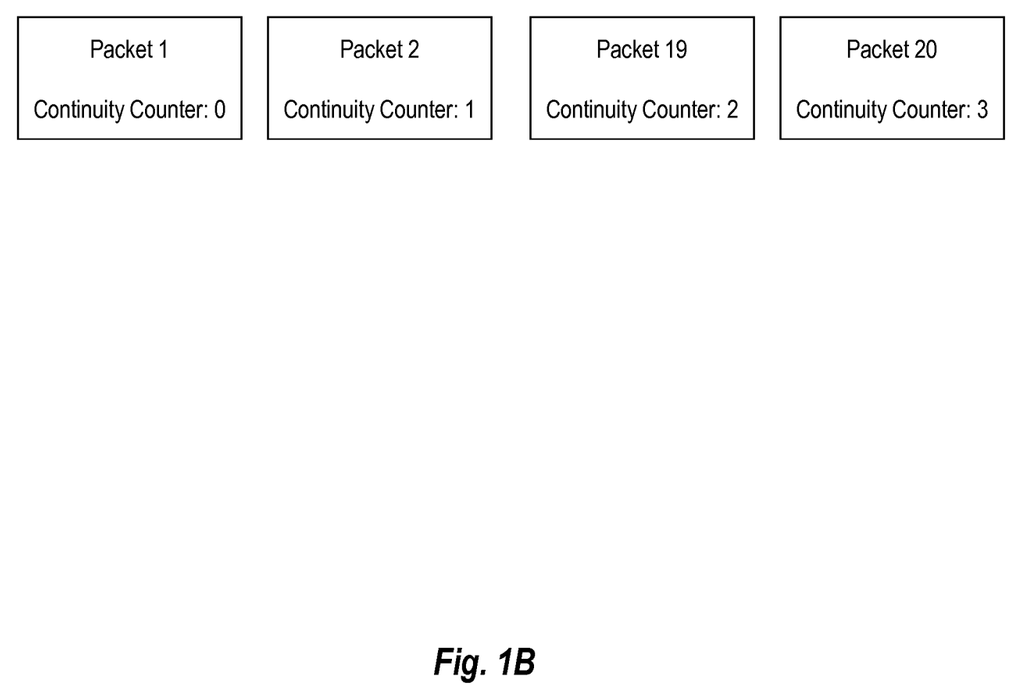

The continuity counter may be consulted as packets are received in order to detect packet loss. For example, as shown in FIG. 1B (which represents the data stream of FIG. 1A as received by a receiver), Packets 3-6 may be lost during transmission. Thus, the receiver receives Packet 1 having a continuity counter value of "0," Packet 2 having a continuity counter value of "1," and Packet 7 having a continuity counter value of "6." By detecting the gap in the continuity counter values, the receiver may identify that Packets 3-6 are missing. If the missing packets do not arrive in a predetermined amount of time, then the receiver may request that Packets 3-6 be retransmitted.

SUMMARY

A problem exists with the conventional use of a continuity counter in that, if a number of packets are lost which is a multiple of the number of values representable by the continuity counter, the packet loss may remain undetected. The failure to detect the packet loss is because the continuity counter in this situation will not reflect a gap, having rolled back over to the minimum value among the lost packets and having reached the next value expected by the receiver by the time the next non-missing packet is received. Thus, the continuity counter appears, in this situation, as if no packet loss has occurred.

In order to address these and other problems, the present application provides methods, mediums, and systems for detecting the loss of one or more packets transmitted to a receiver, identifying which packets were lost, and requesting that the lost packets be re-transmitted.

According to one embodiment, a sender may calculate identifiers for a plurality of original streaming packets. The original streaming packets may be associated with a continuity counter that is capable of representing a number n of values. The sender may encapsulate a number m of original streaming packets with an encapsulating packet, wherein the number m of original streaming packets lacks any common factors with the number n of values.

In the event of packet loss, the sender may receive a request to retransmit a plurality of missing packets. The plurality of missing packets may be identified using one or more missing packet identifiers. The sender may compare the missing packet identifiers to the calculated identifiers for the plurality of original streaming packets to identify a plurality of retransmission streaming packets to be retransmitted. The sender may retransmit the plurality of retransmission streaming packets in response to the request.

According to another embodiment, a receiver may accept an encapsulating packet that encapsulates a plurality of streaming packets. The streaming packets may be associated with a continuity counter that is capable of representing a number n of values. The receiver may de-encapsulate the plurality of streaming packets. A number m of streaming packets may be de-encapsulated from the encapsulating packet such that the number m of streaming packets lacks any common factors with the number n of values. The receiver may determine whether a gap exists between values of the continuity counters of two or more adjacent streaming packets.

According to another embodiment, a receiver may receive a plurality of packets from a sender. The plurality of packets may represent a stream of data. The receiver may determine, using a processor, that a gap exists between adjacent packets among the plurality of packets. The receiver may further identify a beginning of the gap and an end of the gap.

The receiver may move backwards among the plurality of packets from the beginning of the gap until a starting packet is identified. The starting packet may be determined to be likely a unique packet. Similarly, the receiver may move forwards among the plurality of packets from the end of the gap until an ending packet is identified. The ending packet may be determined to be likely a unique packet. The receiver may request that the sender re-transmit packets from the stream of data between the starting packet and the ending packet.

According to another embodiment, a buffer may be provided for storing a plurality of streaming packets. The streaming packets may be associated with a continuity counter that is capable of representing a number n of values. An encapsulating packet may be received from a sender and streaming packets may be de-encapsulated from the encapsulating packet. A number m of streaming packets de-encapsulated from the encapsulating packet may be defined such that the number m of streaming packets lacks any common factors with the number n of values.

The continuity counters of two or more adjacent streaming packets may be compared to determine whether a gap exists between the continuity counters. A beginning of the gap and an end of the gap may be identified based on a starting packet that is determined to be likely a unique packet and an ending packet that is determined to be likely a unique packet. The sender may be requested to re-transmit packets between the starting packet and the ending packet.

By selecting an appropriate value for m such that m lacks any common values with n, the chance of a packet loss that is undetectable using the continuity counter may be greatly reduced. Even if such a packet loss occurs, the packet loss may still be detectable due to the presence of an unusually long gap in inter-packet arrival times at the receiver. Once such a loss is identified, the identity of the missing packets may be established based on the presence of likely unique packets in the stream, and the missing packets may be requested from the original sender.

DETAILED DESCRIPTION

One problem with the use of a conventional continuity counter is that such a continuity counter may be unable to detect packet loss if the number of lost packets is a multiple of the number of values that can be represented by the continuity counter.

Figure 1C:
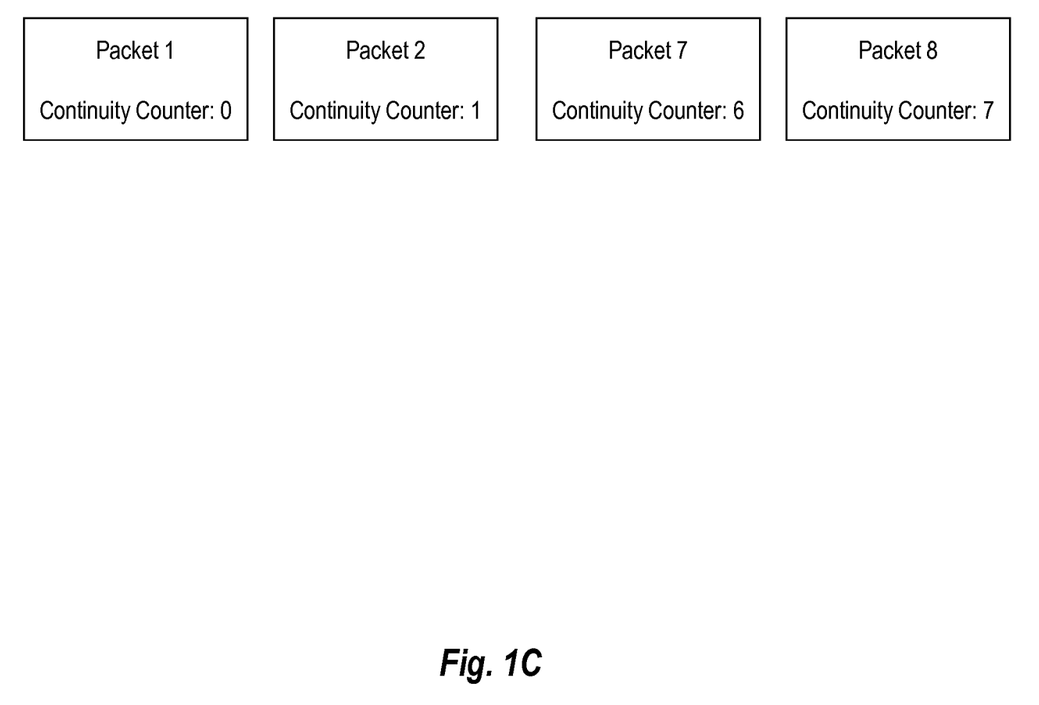

Such a situation is shown in FIG. 1C (which represents the data stream of FIG. 1A as received by a receiver). In this example, the continuity counter has a size of four bits and is therefore capable of representing up to sixteen values. In FIG. 1C, Packets 3-18 have been lost. Because sixteen packets have been lost, and the number of lost packets is a multiple of the number of values representable by the data stream's 4-bit continuity counter, no gap exists in the continuity counter values received by the receiver. Thus, the receiver sees continuity counter values of "0-1-2-3- . . . " with no gaps and determines that no packet loss has occurred.

Exemplary embodiments address this problem by encapsulating a number m of original streaming packets in an encapsulating packet and transmitting the encapsulating packet from the sender to the receiver. In this situation, if packet loss occurs, the encapsulating packet is lost. m original streaming packets are lost for every lost encapsulating packet. By choosing an appropriate value for m in comparison to the number n of values that the continuity counters of the original streaming packets are capable of representing, undetectable packet loss may be made significantly less likely.

Figure 2A:
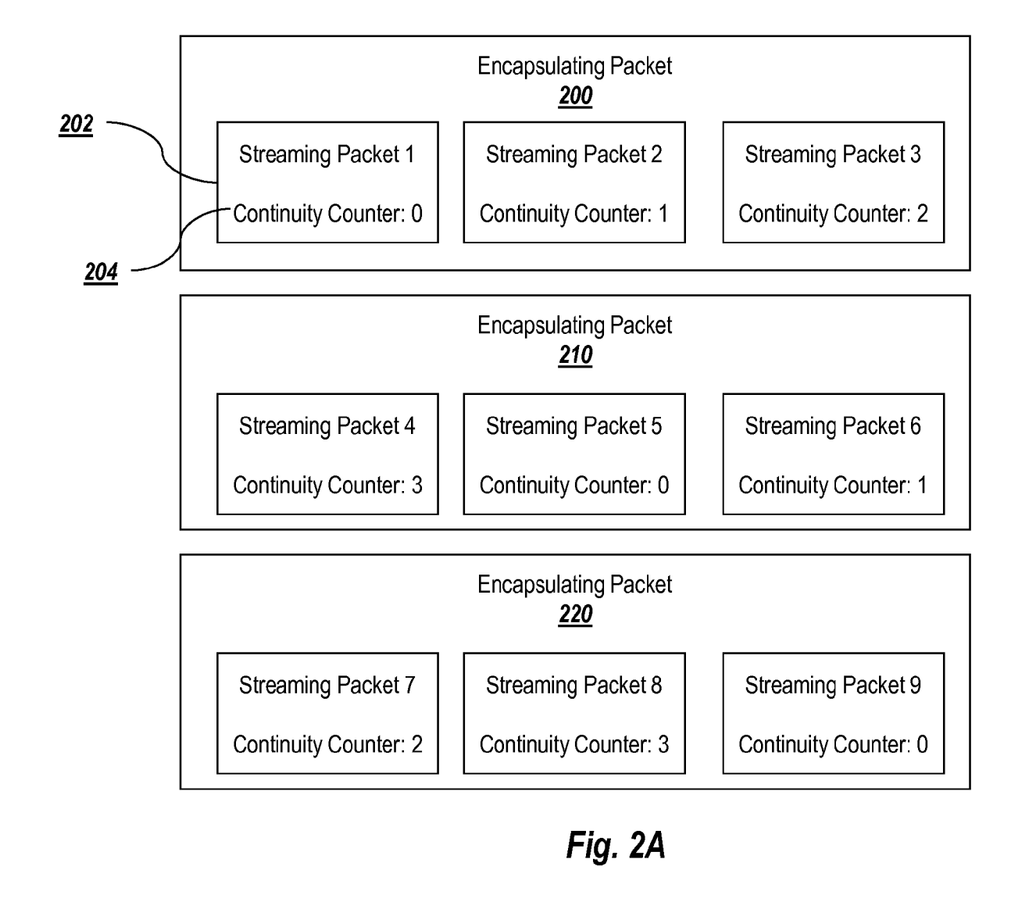
FIGS. 2A-2B depict exemplary encapsulating packets suitable for use with exemplary embodiments described herein.

An exemplary encapsulating packet 200 is depicted in FIG. 2A. Packets are typically made up of a header, which includes administrative information such as the sender of the packet, the receiver of the packet, and a continuity counter, and a payload which includes the information to be transmitted from the sender to the receiver. An encapsulating packet is a packet which includes at least one other packet as a payload.

A plurality of original streaming packets may be encapsulated into an encapsulation packet according to an encapsulation protocol. One example of an encapsulation protocol suitable for use with exemplary embodiments is the User Datagram Protocol (UDP), although one of ordinary skill will recognize that any suitable encapsulation protocol may be used with exemplary embodiments.

A plurality of encapsulated streaming packets 202 may be encapsulated in a single encapsulating packet 200. For example, a number m of streaming packets 202 may be encapsulated in the encapsulating packet 200. The number m of streaming packets 202 encapsulated by the encapsulating packet 200 may be written at a predetermined or designated location in the header of the encapsulating packet 200. Alternatively, the number m of streaming packets 202 encapsulated by the encapsulating packet 200 may be predetermined and stored at the sender and receiver.

When the encapsulating packet 200 is received by the receiver, the receiver may de-encapsulate the encapsulating packet 200 to extract the original streaming packets 202 from the payload of the encapsulating packet. The packet may be de-encapsulated according to the encapsulation protocol (e.g., UDP) used to encapsulate the packets.

The encapsulated streaming packets 202 may each be associated with a continuity counter 204 which identifies the streaming packets 202 using a repeating sequence of identifiers (e.g., numbers, letters, bit patterns, etc). The continuity counter 204 may be a counter stored with the packet, or may be stored separately from the packet and associated with the packet, e.g. using a packet ID. The continuity counter 204 of the streaming packets 204 may be capable of representing up to n values. For example, the size of the continuity counter may be b bits, and $n=2^b$.

According to exemplary embodiments, the number m of streaming packets may be chosen so that m has no common factors with n. For example, the continuity counter of FIG. 2A has a size b of 2, so the number of values n representable by the continuity counter is $2^2=4$. The number m of encapsulated packets in this example is chosen to be 3, since m=3 has no common factors with n=4.

As can be seen in FIG. 2A, the loss of one encapsulating packet 200 results in the loss of three streaming packets 202. Thus, if the encapsulating packet 210 is lost but the encapsulating packets 200, 220 are received by a receiver, then when the receiver de-encapsulates the encapsulating packets 200, 220 and retrieves the streaming packets, a gap may be identified in the continuity counters (which will appear as "0-1-2-2-3-0").

In fact, by choosing a value for m such that m has no common factors with n, it would require the loss of a multiple of n*m streaming packets (or n encapsulating packets) before the loss would not be detectable by the continuity counter alone. In the example of FIG. 2A, this would mean the loss of a multiple of 12 streaming packets (or, equivalently, 4 encapsulating packets). Without the use of the encapsulating packet, an undetectable loss could occur with the loss of a multiple of 4 of the streaming packets. Thus, using the encapsulating packet, the loss of the precise number of streaming packets such that the loss would be undetectable becomes less likely.

In the event of a packet loss that is undetectable using solely the continuity counter, it should be noted that such a loss means that a relatively larger amount of data has been lost as compared to the case where no encapsulating packet is used. Thus, the inter-packet arrival times (i.e., the amount of time between the arrival of one packet and the packet immediately after) may be used to detect the loss.

For example, if each of the streaming packets is 1 MB in size, then an undetectable loss would require the loss of a multiple of 12 MB of data (as compared to the loss of 4 MB of data in the case where an encapsulating packet is not used). If the network is transferring, on average, 1 MB/sec of data for this particular stream, then a loss that is undetectable using the continuity counter would require that no packets are seen for at least 12 seconds. This compares with the receipt of a packet every 3 seconds in the case where no loss has occurred. Due to the long delay in inter-packet arrival times, it may be assumed that a packet loss has occurred.

The exemplary packets of FIG. 2A offer a relatively simple overview in the case where the continuity counter is two bits in size. In real-world use cases, however, the continuity counter is likely to be larger (e.g., four bits in the case of a typical MPEG2-TS). Thus, the values for n and m are likely to be larger than the example of FIG. 2A in practice, which leads to improved packet loss detection. This is because larger values for n and m result in a proportionally larger number of packets that must be lost before the loss becomes undetectable using the continuity counter alone. Furthermore, the loss of the proportionally larger number of packets also results in a proportionally larger and more exaggerated gap in inter-packet arrival times, which makes it easier to detect such a loss if the continuity counter reflects no gap.

Figure 2B:
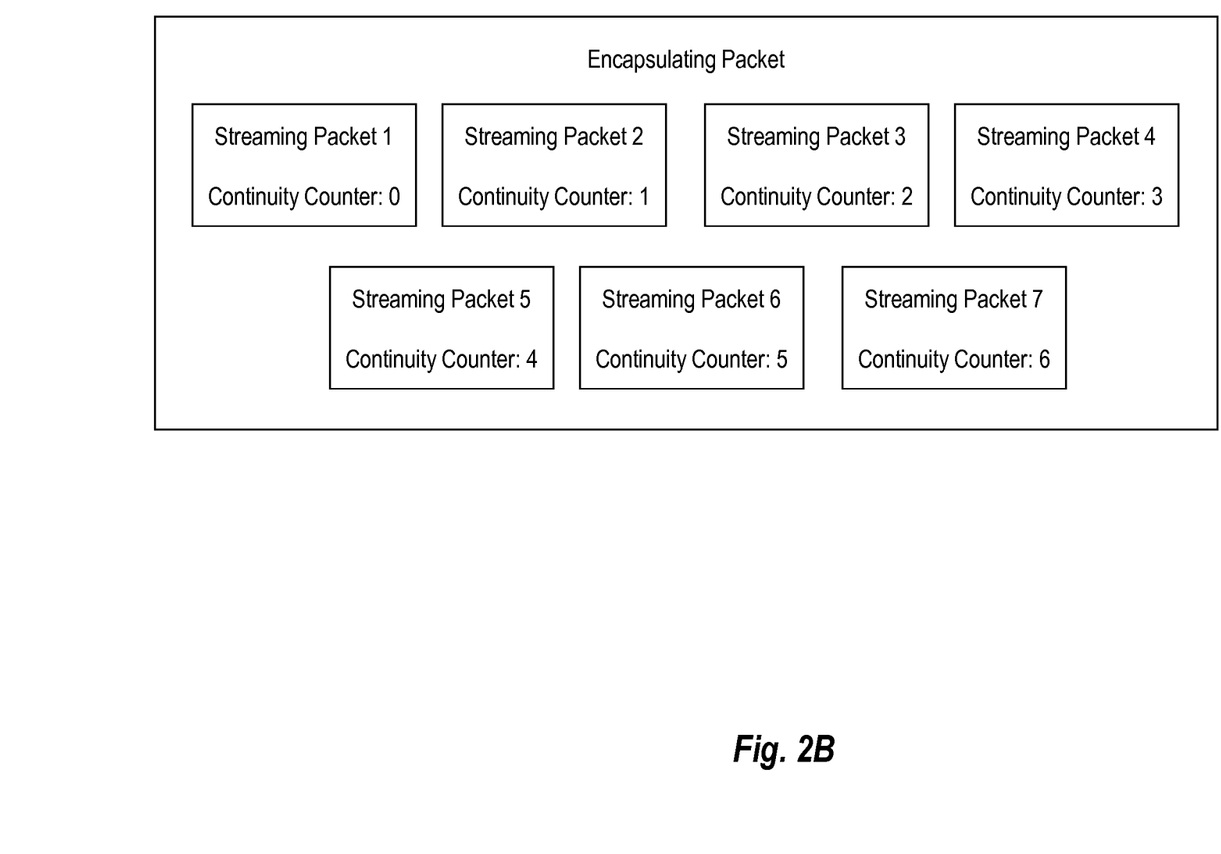

For example FIG. 2B depicts one real-world example of an exemplary embodiment employed in the case of an MPEG2-TS stream having a 4-bit continuity counter. MPEG2-TS packets may be 188 bytes in length, and it is assumed that the MPEG2-TS stream is transmitted at a rate of 15 megabits/second (Mbps).

Thus, in FIG. 2B, the value for n is 16, and m is chosen to be 7. Thus, each encapsulating packet may be (excepting administrative information such as the header of the encapsulating packet) 188 bytes*7 MEPG2-TS packets=1316 bytes.

It will be understood based on the definition of the value m that m need not necessarily be chosen to be 7 in this situation. Other suitable values for m which do not have a factor in common with n (16) include 3, 5, 9, 11, 13, and 15. Choosing a higher value for m will result in larger encapsulating packets, which may make it easier to detect a loss of the encapsulating packets using inter-packet arrival times.

In the example of FIG. 2B, a multiple of 112 (i.e., 7*16) streaming MPEG2-TS packets would need to be lost for the loss to be undetectable by the continuity counter alone. This corresponds to the loss of 188 bytes*112 packets=21,056 bytes of data. In a 15 Mbps network, this would result in an inter-packet arrival time of about 10.7 milliseconds. In contrast, under normal conditions with no data loss in the same network, one would normally expect to receive an encapsulating packet every 0.7 milliseconds. Such a lengthy delay may be recognized by the receiver in order to determine that a packet loss has occurred.

Figure 3A:
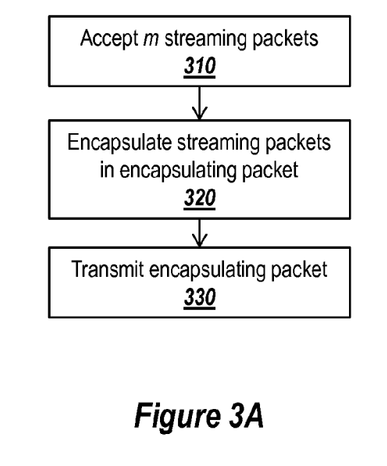
FIG. 3A is a flowchart depicting an exemplary process performed by a sender to encapsulate a plurality of streaming packets.

Accordingly, using encapsulating packets such as those shown in FIGS. 2A and 2B, a loss of packets may be readily detected. FIG. 3A is a flowchart depicting an exemplary process performed by a sender to encapsulate a plurality of streaming packets.

At step 310, a number m of streaming packets may be accepted at the sender. The number m may be a preprogrammed value entered through an interface, or may be determined by consulting a continuity counter associated with the streaming packets. The sender may identify a size of the continuity counter (e.g., in bits) and may calculate a number n of values that are representable by the continuity counter based on the size of the continuity counter.

The sender may identify factors of n, and may select a value m such that m has no common factors with n. If more than one value for m is possible, then the sender may choose the highest possible value. Alternatively, the sender may choose a value based on predetermined selection criteria and/or one or more characteristics of the network. For example, larger values of m will tend to result in larger encapsulating packets. The sender may choose a value for m based on the maximum transmission unit (MTU) of the network (e.g., selecting a value for m based on the size of the streaming packets and any overhead data transmitted in the header of the encapsulating packet in order to achieve an encapsulating packet size that is smaller than the MTU of the network, such as the largest possible value of m that results in a transmissible encapsulating packet). Alternatively, the sender may choose a value for m based on the speed at which packets must be received by the receiver. For example, if the receiver requires the packets in relatively quick succession, then it may be preferable to include fewer streaming packets in the encapsulating packet in order to allow the streaming packets to arrive at the receiver in a more streamlined fashion, rather than in larger discrete chunks of data. The sender may also balance factors such as the size of the encapsulating packet, characteristics of the network, risk of loss of the packets, and characteristics of the sender or receiver.

Alternatively, a random or arbitrary value for m may be chosen from among the possible values of m.

At step 320, m streaming packets may be encapsulated in an encapsulating packet. The streaming packets may be encapsulated by creating a payload from the m streaming packets and wrapping the payload in an encapsulating packet including an encapsulating packet header. The encapsulating packet header may specify the receiver (e.g., as retrieved from a header of the streaming packet or as specified by the sender).

The streaming packets may be encapsulated according to an encapsulation protocol, such as User Datagram Protocol (UDP). However, the present invention is not limited to the use of UDP, and any suitable encapsulation protocol may be used.

At step 340, the encapsulating packet may be transmitted by the sender. The sender may transmit the encapsulating packet using a network interface connected to a network which is capable to forwarding the packet towards the receiver.

Figure 3B:
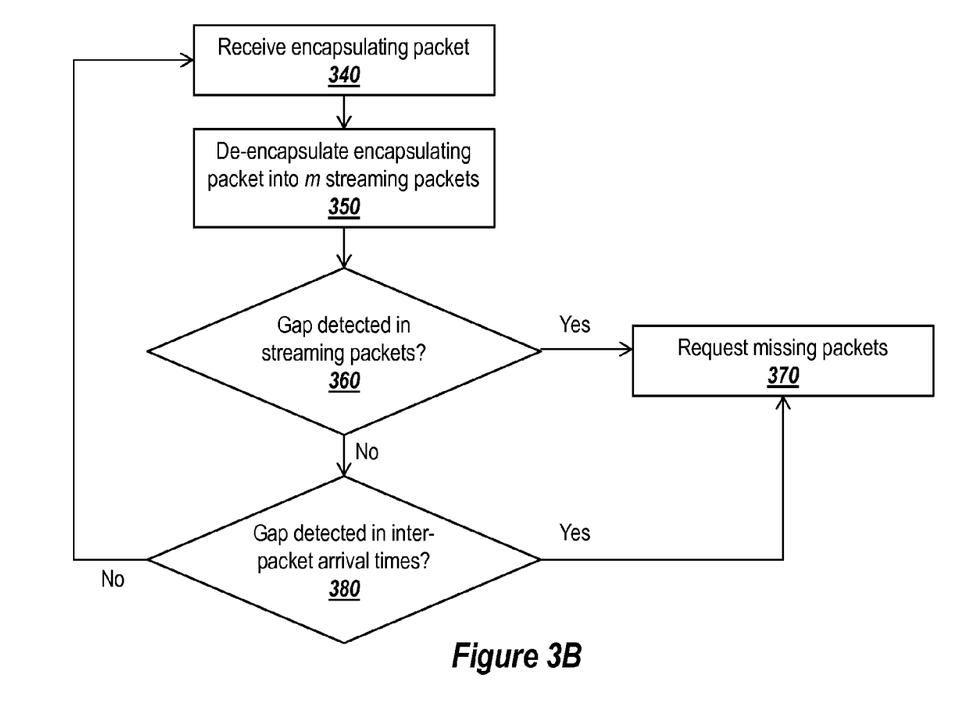
FIG. 3B is a flowchart depicting an exemplary process performed by a receiver to detect whether packet loss has occurred and request the re-transmission of any missing packets.

After the encapsulating packets are transmitted from the sender, some or all of the encapsulating packets may be received by a receiver. FIG. 3B is a flowchart depicting an exemplary process performed by a receiver to detect whether packet loss has occurred and request the re-transmission of any missing packets.

At step 340, the receiver may receive an encapsulating packet. The encapsulating packet may be received on a network interface connected to a network that forwards the encapsulating packet from the sender to the receiver.

The receiver may identify that the received packet is an encapsulating packet. For example, the receiver may identify that the packet is an encapsulating packet based on header information in the encapsulating packet that identifies that the packet is an encapsulating packet and/or identifies a protocol used to encapsulate the packet. Alternatively, a predetermined ingress port may be specified for packets which are encapsulated as described in exemplary embodiments herein, and any packets received on the predetermined ingress port may be assumed to be an encapsulating packet. The sender may therefore include the specified ingress port as a part of the encapsulating packet header.

At step 350, the receiver may de-encapsulate the encapsulating packet to extract the original streaming packets from the payload of the encapsulating packet. For example, the receiver may consult the header of the encapsulating packet to determine the value of m. The value of m may alternatively be predetermined and stored at the receiver. The receiver may then process the payload of the encapsulating packet by dividing the payload into m original streaming packets. Alternatively, the receiver may retrieve m original streaming packets from the payload of the encapsulating packet by searching for identifiers that indicates the start and/or end of a packet, or by dividing the payload into packets based on a known packet size (e.g., retrieved from the header of the packets beginning with the first encapsulated original streaming packet in the payload).

At step 360, the receiver may analyze the continuity counters of the de-encapsulated streaming packets and determine if a gap exists between a previously-received continuity counter and the continuity counters of the streaming packets encapsulated by the encapsulating packet received at step 340. For example, the receiver may maintain a counter or buffer for storing the last-received continuity counter, and may compare the continuity counters of the streaming packets received at steps 340-350 to the buffer or counter.

If a gap is detected in the continuity counters of the streaming packets, then processing may proceed to step 340 and the missing packets may be requested from the sender. The receiver may formulate such a request by specifying a starting packet and an ending packet, where the missing packets fall between the starting packet and the ending packet. If the identity of the missing packets and/or a range of packets which include the missing packet are known, then the request may be formulated and transmitted immediately. If the identity of the missing packets is not precisely known, then a range may be determined. An exemplary method for determining such a range is described below with respect to FIGS. 4-5B.

If there is no gap in the continuity counters, this may indicate that all packets have been successfully received. However, as noted above it is also possible that a multiple of n packets were lost such that the loss is undetectable by the continuity counter alone. Accordingly, at step 380 the inter-packet arrival times may be compared to determine whether a gap exists between the receipt of subsequent encapsulating packets. The inter-packet arrival times may be stored in a buffer or maintained in a counter at the receiver by logging the local time at which successive packets were received in the buffer or calculating a time difference between the receipt of subsequent packets and storing the time difference in the counter. In one embodiment, timestamp data from the packets may be used to calculate inter-packet arrival times.

According to one embodiment, the inter-packet arrival times may be compared to an expected inter-packet arrival time. The expected inter-packet arrival time may be based on an average inter-packet arrival time for recently-arrived packets, may be predetermined and stored at the receiver, or may be calculated based on network conditions and/or the size of the encapsulating packet. For example, the receiver may estimate the speed of data transmission in the network using test data or routine network traffic. The receiver may also determine the size of the encapsulating packet (e.g., using packet header data or by measuring the size of the header and payload), and may calculate an expected network transit time using the calculated network speed and packet size.

If the expected inter-packet arrival time differs from the observed inter-packet arrival time by more than a predetermined amount or more than a predetermined factor, then the receiver may determine that packet loss has occurred and processing may proceed to step 370. The predetermined amount may be determined based on the values of n and/or m. For example, if packets are expected every x seconds, then a predetermined factor of n may be defined such that, if a packet is not seen for more than x*n seconds, then this may indicate that packet loss has occurred. N may be chosen in this situation because it would require a multiple of n lost encapsulating packets in order for a packet loss to be undetectable by the continuity counter alone.

If no gap is detected in the inter-packet arrival times, and the continuity counters do not suggest a gap, then processing may return to step 340 and another packet may be received.

Figure 4:
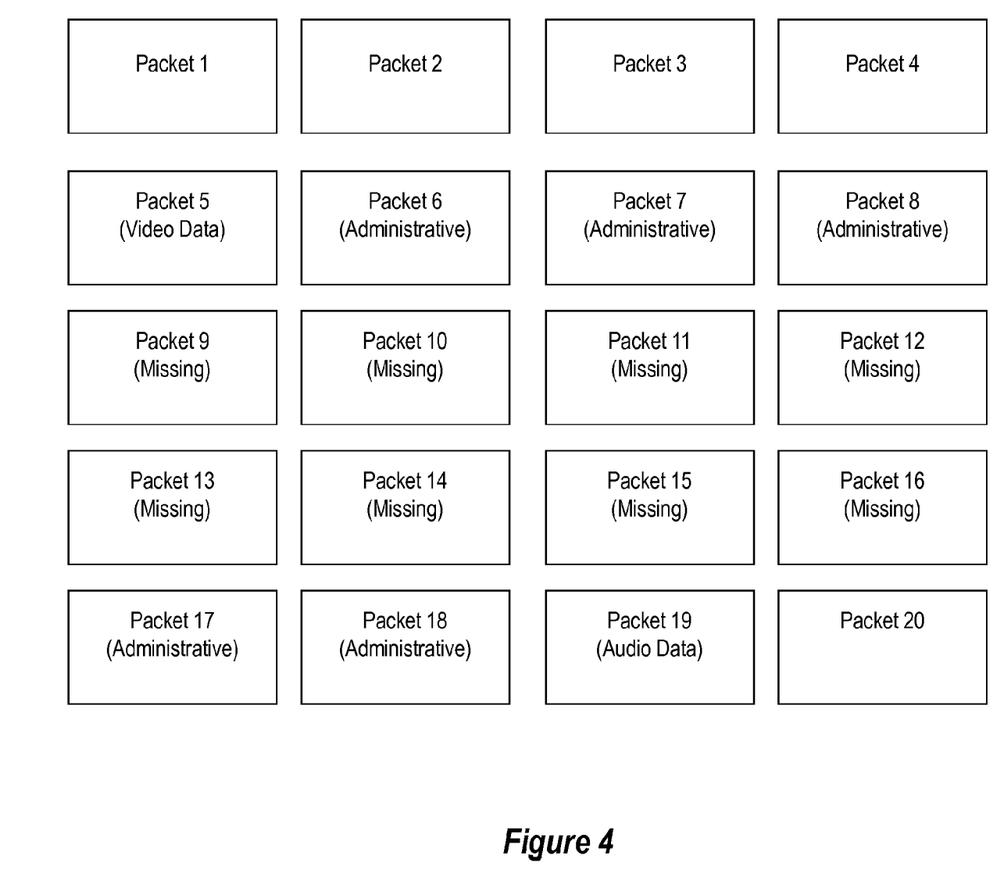
FIG. 4 depicts an exemplary data stream including a plurality of packets.
Figure 5A:
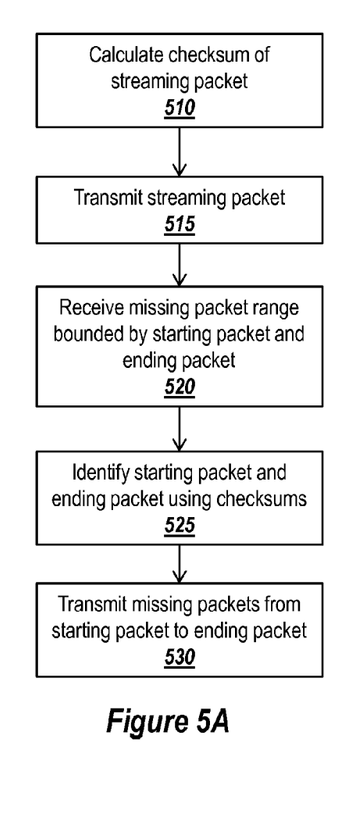
FIG. 5A is a flowchart depicting an exemplary process performed by a sender to retransmit missing packets in response to a request by a receiver.
Figure 5B:
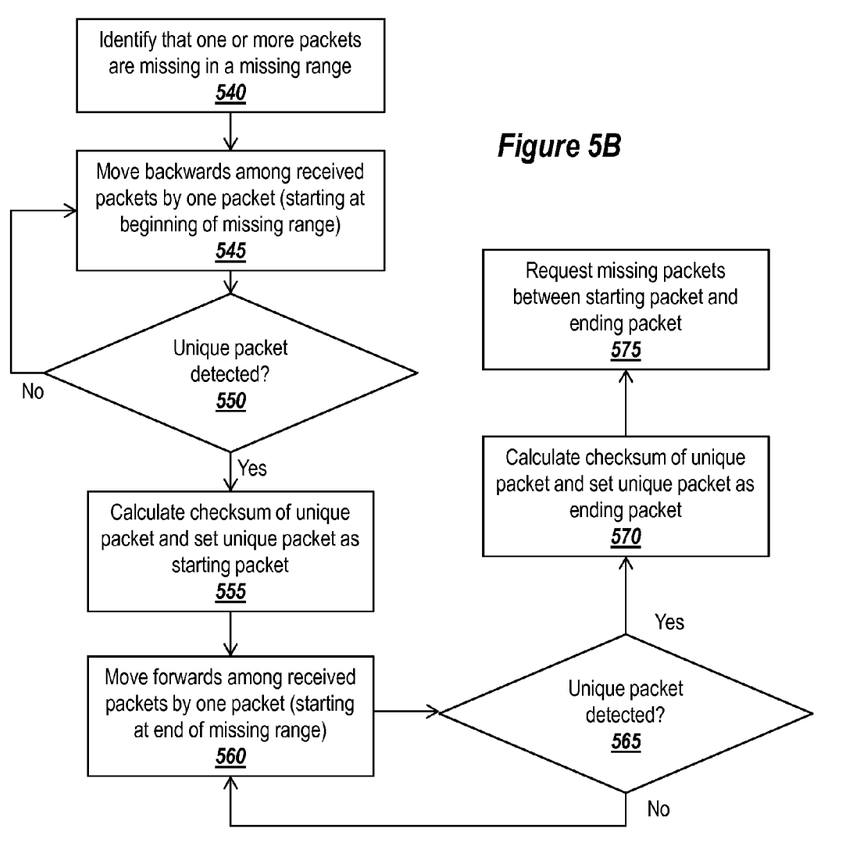
FIG. 5B is a flowchart depicting an exemplary process performed by a receiver for identifying a range of packets, including a plurality of missing packets, for which retransmission is requested from a sender.

Thus, the embodiments of FIGS. 3A and 3B may detect that a packet loss has occurred. FIGS. 4-5B describe embodiments for identifying which packets have been lost, and/or how many packets have been lost.

For example, if the continuity counter does not reflect a gap at step 360, and packet loss is instead determined based on a gap in inter-packet arrival times at step 380, then it may be known that a multiple of n encapsulating packets has been lost. However, it may not be known precisely what multiple of n this is. Consider the example above of MPEG2-TS streaming packets where n=16, where the continuity counter does not reflect a gap but the inter-packet arrival times do reflect a gap. In this case, it may be determined that a multiple of 16 encapsulating packets have been lost. However, it may not be known whether 16 packets have been lost, or 32, or 48.

Furthermore, if these missing packets are to be requested for retransmission from the sender, it may be necessary to identify which packets are being requested.

Accordingly, in exemplary embodiments a range of requested packets may be determined. The range of requested packets may be a range including the missing packets and bracketed by a starting packet and an ending packet that are determined to be likely unique. By choosing likely unique packets to bracket the range, the range can be readily identified to the sender based on the identity of the likely unique packets. Packets which are likely unique include packets that are not administrative traffic or network control traffic. For example, likely unique packets include audio data, video data, image data, etc.

If packets which are not likely to be unique are chosen to bracket the range of requested packets, then it may be difficult for the sender to identify at which packets the range begins and ends. For example, if the range begins with an administrative packet sent by the sender, then this packet may be very similar to other administrative packets and the sender may be unable to determine precisely where the range begins. On the other hand, if a packet is chosen which is likely to be unique, then the sender may maintain checksums of the sent packets and, by comparing a checksum as calculated by the receiver to a checksum as calculated by the sender, the precise packet which identifies the beginning or ending of the range may be determined.

For example, FIG. 4 depicts an exemplary data stream including a plurality of packets as received by a receiver. As shown in FIG. 4, Packets 9-16 were lost during transmission and are to be requested from the sender. However, it may be inadvisable to request packets beginning with Packet 8 and/or ending with Packet 17 (the minimum range which would include all missing packets), because Packets 8 and 17 are administrative packets and may not be unique. Hence, if the receiver calculates a checksum on the received Packets 8 and 17, then this checksum may match numerous other checksums for administrative packets sent by the sender, and the sender may be unable to determine where the requested range begins and ends.

On the other hand, the receiver may search backwards from the beginning of the range and forwards from the end of the range to find packets which are likely to be unique. The uniqueness of packet may be determined based on a heuristic that determines a probability of the uniqueness of a packet (e.g., the lack of repeating data, filtering based on common bit sequences, etc). Alternatively, the uniqueness may be determined based on a metric such as what type of data the packet includes (e.g., likely unique data may include video data, audio data, image data, etc., or may simply be any data which is not determined to be administrative). The type of the data may be determined based on packet header information, packet format information, data format information, metadata associated with the data, or an analysis of the data, among other possibilities.

In order to be able to retransmit any missing streaming packets, the sender may write checksums of the streaming packets to a buffer as the streaming packets are encapsulated in the encapsulating packet. For example, FIG. 5A is a flowchart depicting an exemplary process performed by a sender to retransmit missing packets in response to a request by a receiver.

At step 510, the sender may calculate a checksum of the streaming packet. The sender may calculate the checksum by deriving a value, such as a hash value, from all or a subset of the data in the streaming packet. Alternatively, the sender may calculate a checksum in the normal course of transmitting the packets, as may be done in the case of UDP packets. In this case, the routinely calculated checksum may be noted and stored.

The sender may store the checksums and an identifier of the packet in a data structure such as a buffer, database, hash table, etc. The data structure may further store a sequence or order of packets so that, given any two packets, the data structure is capable of identifying each of the packets that are to be transmitted between the two packets.

The checksums may be stored on a temporary basis, such as by storing the checksums in a circular buffer or by deleting stored checksums from the data structure after a predetermined amount of time. Once the checksum is calculated and stored, at step 515 the sender may transmit the streaming packet within an encapsulating packet.

At step 520, the receiver may receive a request for missing packets from the receiver. The request may specify a range of packets which the receiver requests be retransmitted. The range may be bounded by a starting packet and an ending packet, and checksums for the starting packet and the ending packet may be provided in the request.

At step 525, the sender may compare the checksums provided in the request to the checksums stored in the data structure to determine an identity of the packets at the start and end of the range of requested packets. Once the start and end of the range are determined, at step 530 any packets identified (e.g., in the data structure) as being between the start and end of the range may be re-transmitted to the receiver. In some embodiments, the sender may re-transmit the requested packets over a different transmission medium than originally used to transmit the packets at step 515. For example, if the packets are originally transmitted over a lossy medium and another, non-lossy medium is available, then the packets may be transmitted over the lossy medium at step 515 and re-transmitted over the non-loss medium at step 530.

At the receiver side, once a packet loss is identified, the receiver may identify which packets are to be requested for retransmission. FIG. 5B is a flowchart depicting an exemplary process performed by a receiver for identifying a range of packets, including a plurality of missing packets, for which retransmission is requested from a sender.

At step 540, the receiver may identify that one or more packets are missing or have been lost. For example, the receiver may employ a procedure such as the one depicted in FIG. 3B. The receiver may identify the loss of the packets based on a gap in the received packets. For example, the receiver may receive a stream of data, for which a gap is known to exist between a final packet of a first received encapsulating packet and a beginning packet of a second received encapsulating packet. It may be unknown how many packets are missing between the final packet and the beginning packet.

At step 545, starting at the beginning of the missing range or gap (e.g., starting at the final packet of the first received encapsulating packet), the receiver may search backwards in the streaming packets until a likely unique packet is detected at step 550. When a likely unique packet is detected, then at step 555 the receiver may calculate a checksum of the likely unique packet, for example using a predetermined checksum routine which is the same as the checksum routine employed by the sender at step 510. The likely unique packet may be set as the starting packet for the range of packets for which re-transmission is to be requested.

At step 560, starting at the end of the missing range or gap (e.g., starting at the beginning packet of the second received encapsulating packet), the receiver may search forwards in the streaming packets until a likely unique packet is detected at step 565.

When a likely unique packet is detected, then at step 570 the receiver may calculate a checksum of the likely unique packet, for example using a predetermined checksum routine which is the same as the checksum routine employed by the sender at step 510. If the receiver calculates a checksum in the normal course of receiving the packets, as may be done in the case of UDP packets, then the routinely calculated checksum may be used.

The likely unique packet may be set as the ending packet for the range of packets for which re-transmission is to be requested.

At step 575, the receiver may formulate a request specifying a range of packets to be requested for retransmission. The receiver may specify that the range is bounded by the starting packet and the ending packet, and may further specify the checksum values for the starting packet and the ending packet. The request may be transmitted to the sender, and in response the receiver may receive the packets in the requested range, including the missing packets.

FIG. 5B depicts one example of requesting missing packets, although it is understood that other embodiments are also possible. For example, instead of requesting a range of packets bounded by a starting packet and an ending packet, the receiver may identify a single packet and request that all packets (or a predetermined number of packets) sent before or after the identified packet be retransmitted.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 4 depicts an example of an electronic device 400 that may be suitable for use with one or more acts disclosed herein.

Figure 6:
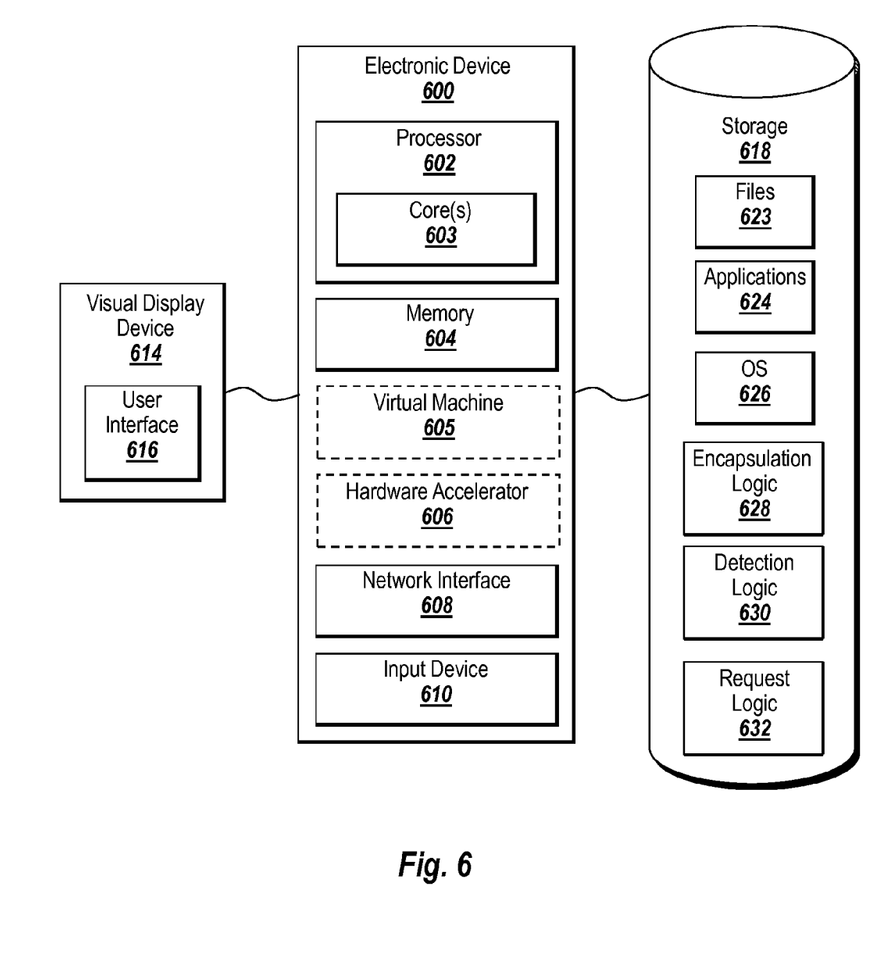
FIG. 6 depicts an exemplary computing device suitable for use with exemplary embodiments.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, components illustrated in FIG. 4 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 600 may include a virtual machine (VM) 505 for executing the instructions loaded in the memory 604. A virtual machine 505 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 505 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further store encapsulation logic 628, such as logic for implementing UDP. The encapsulation may be performed in accordance with the exemplary embodiment described above with respect to FIGS. 2A, 2B, and 3A. The encapsulation logic 628 may further include logic for de-encapsulating encapsulated packets, as described with respect to FIG. 3B.

Moreover, the storage device 618 may include detection logic 630 for detecting that a packet loss has occurred. The detection logic 630 may be logic for implementing the procedures described in FIGS. 3A-3B. In addition, the storage device 618 may include request logic for requesting that missing packets be re-transmitted. The request logic 632 may be logic for implementing the procedures described in FIGS. 5A-5B.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 7:
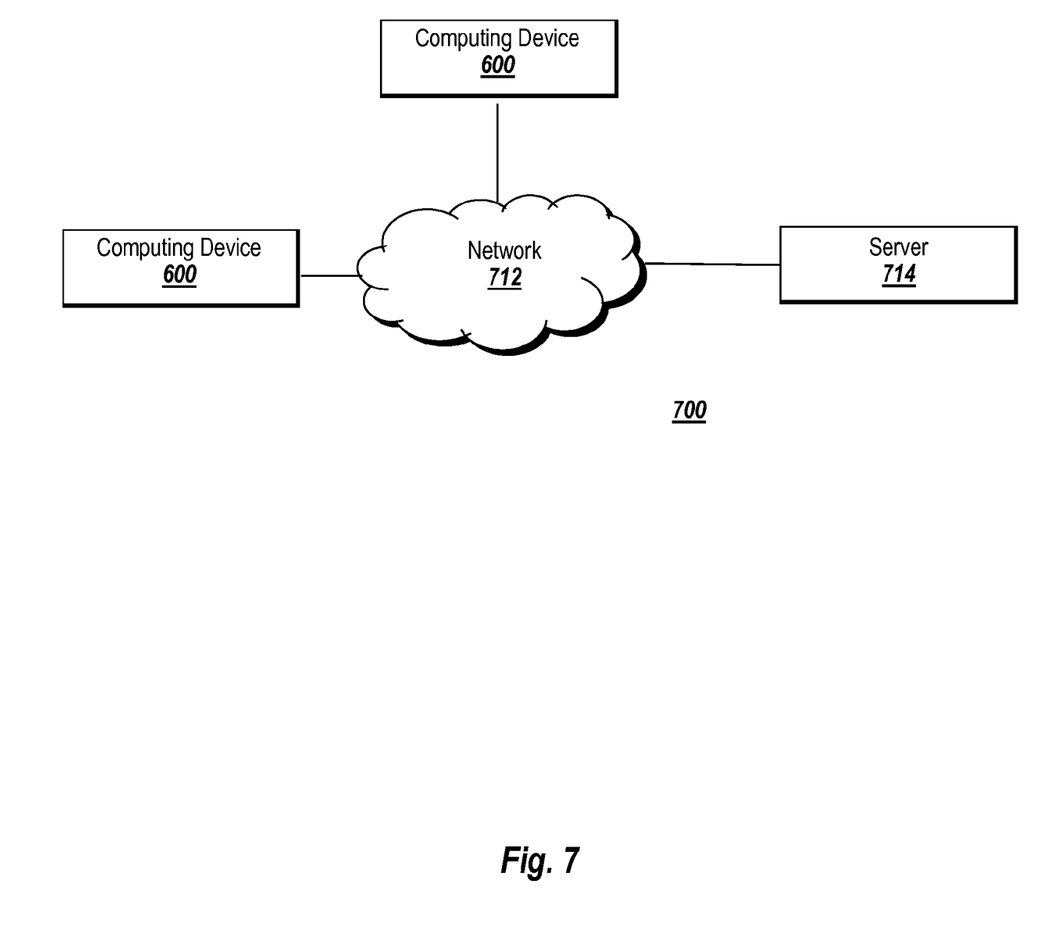
FIG. 7 depicts an exemplary network configuration suitable for use with exemplary embodiments.

Exemplary embodiments may be implemented in a network environment, such as the environment 700 depicted in FIG. 7. The environment 700 may include one or more computing devices 600, such as the exemplary computing device 600 of FIG. 6. The computing device 600 may be a device for sending or receiving data via a network 712. The network 712 may be, for example, the Internet, an intranet, or any other suitable network. The network 712 may employ one or more transmission mediums, such as copper wire, fiber optic cable, or wireless signals to transmit data from a sender to a receiver. In some embodiments, the environment 700 may further include a server 714 acting as the sender and/or the receiver. The server may provide a service, such as email services, mapping services, data storage services, processing services, etc. to one or more computing devices via the network 712.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory electronic device readable storage medium holding instructions that, when executed, cause one or more processors to:
   receive an encapsulating packet that encapsulates a plurality of streaming packets from a sender computing device, wherein the streaming packets are associated with a continuity counter that is capable of representing a number n of values;
   de-encapsulate the plurality of streaming packets, wherein a number m of streaming packets are de-encapsulated from the encapsulating packet such that the number m of streaming packets lacks any common factors with the number n of values;
   determine whether a gap exists between values of the continuity counters of two or more adjacent streaming packets;
   when the gap exists between the values of the continuity counters of a first streaming packet and a second streaming packet adjacent to the first streaming packet:
      identify a beginning of the gap bounded by the first streaming packet and an end of the gap bounded by the second streaming packet;
      move backwards among the plurality of streaming packets from the beginning of the gap until a starting packet is identified, wherein the starting packet is determined to be a unique packet;
      move forwards among the plurality of streaming packets from the end of the gap until an ending packet is identified, wherein the ending packet is determined to be a unique packet; and
      request the sender computing device to re-transmit streaming packets between the starting packet and the ending packet.

2. The medium of claim 1, wherein the encapsulating packet is a User Datagram Protocol (UDP) packet.

3. The medium of claim 1, wherein the streaming packets are MPEG2-TS packets.

4. The medium of claim 1, wherein the number n of values is 16 and the number m of streaming packets is 7.

5. The medium of claim 1, further storing instructions for:
calculating an expected inter-packet arrival time;
measuring an inter-packet time of adjacent encapsulating packets; and
determining that data loss has occurred if no gap exists between values of the continuity counters of two or more adjacent streaming packets, but the measured inter-packet arrival time exceeds the expected inter-packet arrival time by more than a predetermined threshold amount.

6. A system comprising:
a non-transitory computer-readable medium holding a buffer, the buffer storing a plurality of streaming packets, wherein the streaming packets are associated with a continuity counter that is capable of representing a number n of values; and
a processor configured to:
receive an encapsulating packet from a sender computing device;
de-encapsulate streaming packets from the encapsulating packet, wherein a number m of streaming packets de-encapsulated from the encapsulating packet is such that the number m of streaming packets lacks any common factors with the number n of values;
compare the continuity counters of two or more adjacent streaming packets to determine whether a gap exists;
identify a beginning of the gap bounded by the first streaming packet and an end of the gap bounded by the second streaming packet;
move backwards among the streaming packets from the beginning of the gap until a starting packet is identified, wherein the starting packet is determined to be a unique packet;
move forwards among the streaming packets from the end of the gap until an ending packet is identified, wherein the ending packet is determined to be a unique packet; and
request the sender computing device to re-transmit streaming packets between the starting packet and the ending packet.

7. The system of claim 6, wherein the encapsulating packet is a User Datagram Protocol (UDP) packet.

8. The system of claim 6, wherein the streaming packets are MPEG2-TS packets.

9. The system of claim 6, wherein the number n of values is 16 and the number m of streaming packets is 7.

10. The system of claim 6, wherein the processor is further configured to:
calculate an expected inter-packet arrival time;
measure an inter-packet time of adjacent encapsulating packets; and
determine that data loss has occurred if no gap exists between values of the continuity counters of two or more adjacent streaming packets, but the measured inter-packet arrival time exceeds the expected inter-packet arrival time by more than a predetermined threshold amount.

11. The system of claim 6, wherein the starting packet and the ending packet are identified by an identifier.

12. The system of claim 11, wherein the identifier is a checksum.

13. The system of claim 6, wherein the starting packet and the ending packet are determined to be unique when the starting packet and the ending packet are identified as comprising audio or video data.

14. The system of claim 6, wherein the missing packets are retransmitted over a different transmission medium than the encapsulating packet.

15. A non-transitory electronic device readable storage medium holding instructions that, when executed, cause one or more processors to:
calculate identifiers for a plurality of original streaming packets, wherein the original streaming packets are associated with a continuity counter that is capable of representing a number n of values;
encapsulate a number m of original streaming packets with an encapsulating packet, wherein the number m of original streaming packets lacks any common factors with the number n of values;
transmit the encapsulating packet to a receiver computing device, the encapsulating packet when received by the receiver computing device, causing the receiver computing device to:
identify that a gap exists between values of the continuity counters of a first original streaming packet and a second original streaming packet adjacent to the first original streaming packet;
identify a beginning of the gap bounded by the first original streaming packet and an end of the gap bounded by the second original streaming packet;
move backwards among the plurality of original streaming packets from the beginning of the gap until a starting packet is identified, wherein the starting packet is determined to be a unique packet; and
move forwards among the plurality of original streaming packets from the end of the gap until an ending packet is identified, wherein the ending packet is determined to be a unique packet;
receiving a request from the receiver computing device to retransmit a plurality of missing packets between the starting packet and the ending packet, wherein the plurality of missing packets are identified using one or more missing packet identifiers; and
comparing the missing packet identifiers to the calculated identifiers for the plurality of original streaming packets to identify a plurality of retransmission streaming packets to be retransmitted.

16. The medium of claim 15, wherein the encapsulating packet is a user datagram protocol (UDP) packet.

17. The medium of claim 15, wherein the original streaming packets are MPEG2-TS packets.

18. The medium of claim 15, wherein n is 16 and m is 7.

19. The medium of claim 15, wherein the missing packet identifiers are checksums.

20. The medium of claim 15, further storing instructions for transmitting the retransmission streaming packets over a different transmission medium than the encapsulating packet.

* * * * *